(12) United States Patent
Kim et al.

(10) Patent No.: US 12,398,713 B2
(45) Date of Patent: Aug. 26, 2025

(54) RECIPROCATING COMPRESSOR

(71) Applicant: LG ELECTRONICS INC., Seoul (KR)

(72) Inventors: Younghwan Kim, Seoul (KR); Jinkook Kim, Seoul (KR); Sangmin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 78 days.

(21) Appl. No.: 18/144,433

(22) Filed: May 8, 2023

(65) Prior Publication Data

US 2023/0407915 A1 Dec. 21, 2023

(30) Foreign Application Priority Data

Jun. 15, 2022 (KR) .......................... 10-2022-0072830

(51) Int. Cl.
*F04B 35/04* (2006.01)
*F04B 39/00* (2006.01)
(Continued)

(52) U.S. Cl.
CPC .......... *F04B 35/04* (2013.01); *F04B 39/0094* (2013.01); *F04B 39/122* (2013.01); *F16C 35/067* (2013.01)

(58) Field of Classification Search
CPC ...... F04B 17/03; F04B 35/04; F04B 39/0094; F04B 39/122; F16C 33/58; F16C 33/583; F16C 33/585; F16C 33/586; F16C 35/067
See application file for complete search history.

(56) References Cited

U.S. PATENT DOCUMENTS 10,371,134 B2   8/2019   Tsuboi et al.
2007/0025864 A1* 2/2007  Cho ................... F04B 39/0253
                                                         417/415

(Continued)

FOREIGN PATENT DOCUMENTS

JP   2010-112249   5/2010
JP   2012-36905    2/2012

(Continued)

OTHER PUBLICATIONS

European Seach Report issued in Application No. 23179083.3 dated Oct. 9, 2023.

(Continued)

*Primary Examiner* — Thomas Fink
(74) *Attorney, Agent, or Firm* — KED & ASSOCIATES

(57) ABSTRACT

A reciprocating compressor may include a ball bearing positioned between a thrust surface of a cylinder block and a thrust surface of a crankshaft. The ball bearing may include a ball cage in a ring shape, a plurality of balls rotatably coupled to the ball cage, at least one washer positioned at least one of between the thrust surface of the cylinder block and the plurality of balls and between the thrust surface of the crankshaft and the plurality of balls, and a rotation preventing portion that limits rotation of the washer with respect to the corresponding thrust surface. According to a reciprocating compressor having the rotation preventing portion, as relative rotation of the washer with respect to the thrust surface of the cylinder block and/or the thrust surface of the crankshaft is restrained even if a rotational force higher than a viscous force acting on the washer is applied because a viscosity of oil is lowered, it is possible to eliminate the problem of deterioration of reliability and performance of the compressor.

6 Claims, 15 Drawing Sheets

(51) Int. Cl.
*F04B 39/12* (2006.01)
*F16C 35/067* (2006.01)

(56) References Cited

U.S. PATENT DOCUMENTS

| | | | | |
|---|---|---|---|---|
| 2010/0047093 A1* | 2/2010 | Watanabe | ............... | F16C 33/58 |
| | | | | 417/415 |
| 2011/0200462 A1 | 8/2011 | Inagaki et al. | | |
| 2015/0030478 A1* | 1/2015 | Tsuboi | .................. | F16C 27/066 |
| | | | | 417/415 |

FOREIGN PATENT DOCUMENTS

| JP | 2012-145053 | 8/2012 |
|---|---|---|
| KR | 10-2010-0081807 | 7/2010 |
| KR | 10-2011-0006184 | 10/2011 |
| KR | 10-2012-0037267 | 4/2012 |

OTHER PUBLICATIONS

Korean Office Action issued in Application No. 10-2022-0125009 dated Oct. 12, 2023.

* cited by examiner

RECIPROCATING COMPRESSOR

CROSS-REFERENCE TO RELATED APPLICATION(S)

This application claims priority to and the benefit of Korean Patent Application No. 10-2022-0072830 filed in Korea on Jun. 15, 2022, whose entire disclosure is hereby incorporated by reference.

BACKGROUND

1. Field

A reciprocating compressor, and more particularly, a reciprocating compressor in which a ball bearing assembly is installed between a thrust surface of a cylinder block and a thrust surface of a crankshaft is disclosed herein.

2. BACKGROUND

In general, a hermetic compressor is a compressor that includes a motor that generates power inside of an airtight container and a compression unit that operates by receiving power from the motor. The hermetic compressor may be classified into a reciprocating type, a rotary type, a vane type, or a scroll type, for example, according to a method of compressing a refrigerant, which is a compressible fluid.

The reciprocating compressor is a type in which a crankshaft is coupled to a rotor of a motor, a connecting rod is coupled to the crankshaft, and a piston coupled to the connecting rod compresses refrigerant while linearly reciprocating inside of a cylinder. In the reciprocating compressor, a shaft of the crankshaft is inserted into a cylinder block and supported in a radial direction, while an eccentric mass is placed on the cylinder block and supported in an axial direction.

Therefore, as a journal bearing surface and a thrust bearing surface are formed between the crankshaft and the cylinder block, minimizing frictional loss on the journal bearing surface and the thrust bearing surface serves as an important factor in improving energy efficiency of the compressor. Thus, an oil passage is formed in a conventional crankshaft so that oil pumped from an oil feeder is evenly supplied to each bearing surface through the oil passage.

However, conventional reciprocating compressors have limitations in reducing friction loss as a thrust surface makes surface contact, and considering this, a method of installing a separate bearing like a ball bearing assembly (hereinafter, "ball bearing") is known so that the thrust surface may make point contact. An example of the ball bearing is disclosed in U.S. Pat. No. 10,371,134 (hereinafter, "related art"), which is hereby incorporated by reference.

The ball bearing disclosed in the related art includes structure in which a track groove is formed in a washer to limit displacement of the washer in a radial direction. Referring to FIG. 1, a thrust surface is formed so that a ball bearing 1300 to support the crankshaft in an axial direction is placed around an upper end of a shaft hole formed in the cylinder block and into which the shaft of the crankshaft is inserted.

At an edge of the thrust surface, a bearing restraining part is formed at a predetermined height so that a lower washer (or second washer) 1360 may be supported in the radial direction. In this case, a thrust surface of the crankshaft opposite a thrust surface of the cylinder block may be formed flat.

The ball bearing 1300 includes a ball cage 1330 in a ring shape, at least three or more balls 1340 rotatably coupled to a ball insertion hole 1390 of the ball cage 1330 and, washers 1350 and 1360 installed to be in contact with both sides of the balls 1340 in the axial direction.

The washers 1350 and 1360 may be divided into an upper washer (or first washer) 1350 and a lower washer (or second washer) 1360 around the ball 1340, and the upper washer 1350 and the lower washer 1360 are installed to be radially supported on the cylinder block and the crankshaft, respectively. The washers 1350 and 1360 may be formed in a circular ring shape (a disk shape having an opening in a center), respectively, and track grooves 1370 and 1380 are formed on the main surfaces (the surface in contact with the ball) of the washers 1350 and 1360, respectively.

Therefore, as the ball 1340 is positioned in the track grooves 1370 and 1380 of the washers 1350 and 1360, the ball bearing 1300 may stably operate.

According to this configuration, movement of the upper washer 1350 in the radial direction is limited by a gap with the crankshaft, and movement of the ball cage 1330 and the lower washer 1360 in the radial direction is limited by a gap with a journal of the cylinder block. In the way, as the crankshaft becomes smaller when the compressor is (ultra) miniaturized, when the existing ball bearing is used as it is, the ball cannot stably support the load transmitted through the crankshaft. A miniaturized compressor, that is, a micro-compressor compressor may be referred to as a compressor having at least one of a width, depth, and height of 110 mm or less based on a size of an airtight container. The width and depth may also be referred to as a length in a horizontal direction and a length in a vertical direction.

Therefore, in the case of the micro-compressor, the ball bearing must be made small, but there is a limitation in making the ball bearing small because of the shape and/or structure of the crankshaft and cylinder block. In addition, the washer is attached to the thrust surface of the crankshaft and the thrust surface of the cylinder block by viscous force, respectively, when the compressor is miniaturized, and at high speed, as a contact area between the washer and the thrust surface decreases, an oil temperature rises and viscosity decreases, as a result, when a rotational force higher than the viscous force acting on the washer is applied, the washer intermittently rotates with respect to the thrust surface of the cylinder block and/or the thrust surface of the crankshaft, there is a problem in that reliability and performance of the compressor are deteriorated.

That the compressor is operated at high speed means that the operating speed of the compressor is 85 rps or more. That is, in the case of the micro-compressor, the lower washer to be attached to the thrust surface of the cylinder block may rotate intermittently on the thrust surface of the cylinder block, or the upper washer to be attached to the thrust surface of the crankshaft may intermittently rotate on the thrust surface of the crankshaft.

BRIEF DESCRIPTION OF THE DRAWINGS

Embodiments will be described in detail with reference to the following drawings in which like reference numerals refer to like elements, and wherein.

DETAILED DESCRIPTION

Figure 1:
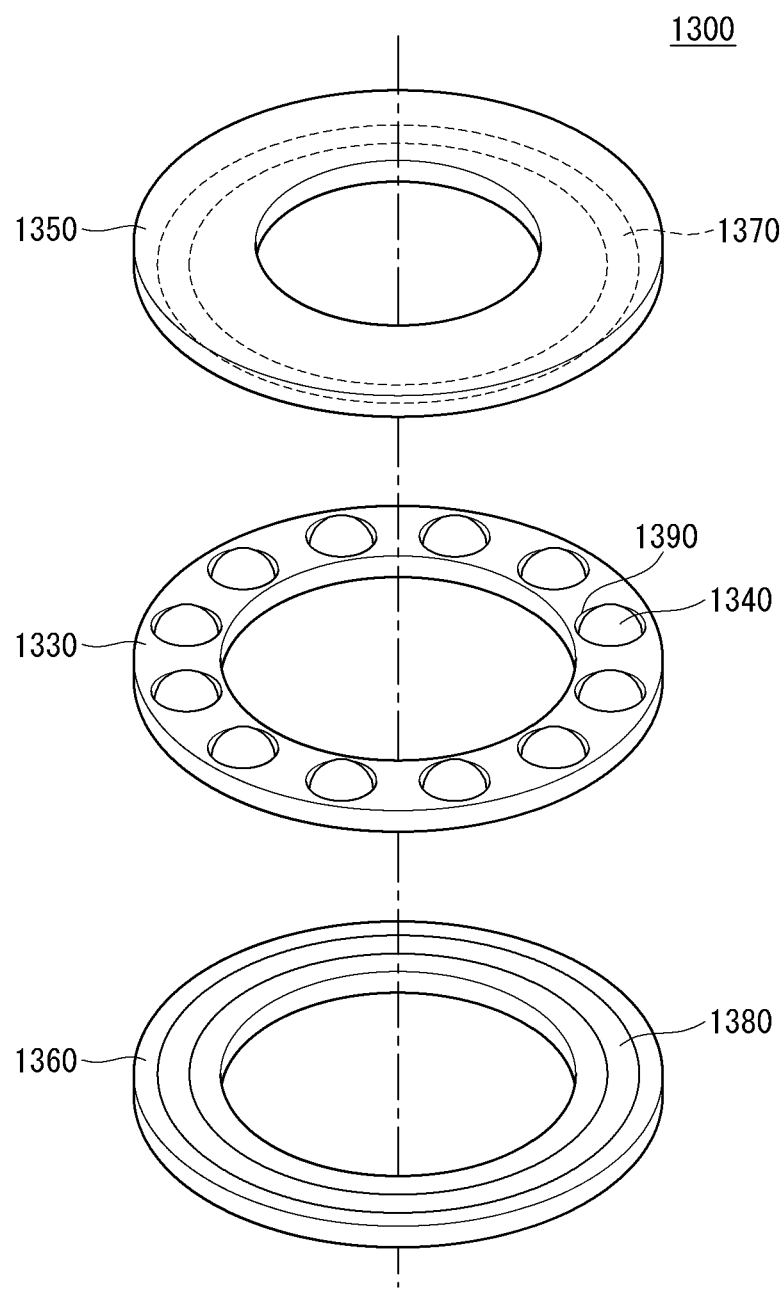
FIG. 1 is a view for explaining a ball bearing structure of a reciprocating compressor according to related art.

Hereinafter, embodiments will be described with reference to the accompanying drawings, however, regardless of the reference numerals, the same or similar components will be given the same reference numerals and redundant description thereof will be omitted.

The suffixes "assembly" and "unit" for elements used in the following description are given or mixed in consideration of only the ease of writing the specification, and do not have distinct meanings or roles by themselves.

In addition, in describing the embodiments, when it is determined that the description of related known technology may obscure the subject matter of the embodiments, detailed description thereof will be omitted.

In addition, the accompanying drawings are only for easily understanding the embodiments, the technical spirit is not limited by the accompanying drawings, and it should be understood that the accompanying drawings include all changes, equivalents, and substitutes included in the spirit and scope of the present disclosure.

While terms, such as "first", "second", etc., may be used to describe various elements, such elements must not be limited by the above terms. The above terms are used only to distinguish one element from another.

When an element is referred to as being "coupled" or "connected" to another element, it may be directly coupled to or connected to the other element, however, it should be understood that other elements may exist in the middle.

On the other hand, when an element is referred to as being "directly coupled" or "directly assembled" to another element, it should be understood that there are no other elements in the middle.

The singular forms are intended to include the plural forms as well, unless the context clearly indicates otherwise.

In addition, in embodiments, it should be understood that the terms "comprise" and "have" specify the presence of stated features, integers, steps, operations, elements, parts, or combinations thereof, but do not preclude the presence or addition of one or more other features, integers, steps, operations, elements, parts, or combinations thereof.

Hereinafter, an embodiment according will be described with reference to the accompanying drawings, however, regardless of the reference numerals, the same or similar elements will be given the same reference numerals and redundant description thereof will be omitted.

Hereinafter, a reciprocating compressor according to an embodiment will be described with reference to the accompanying drawings.

Figure 2:
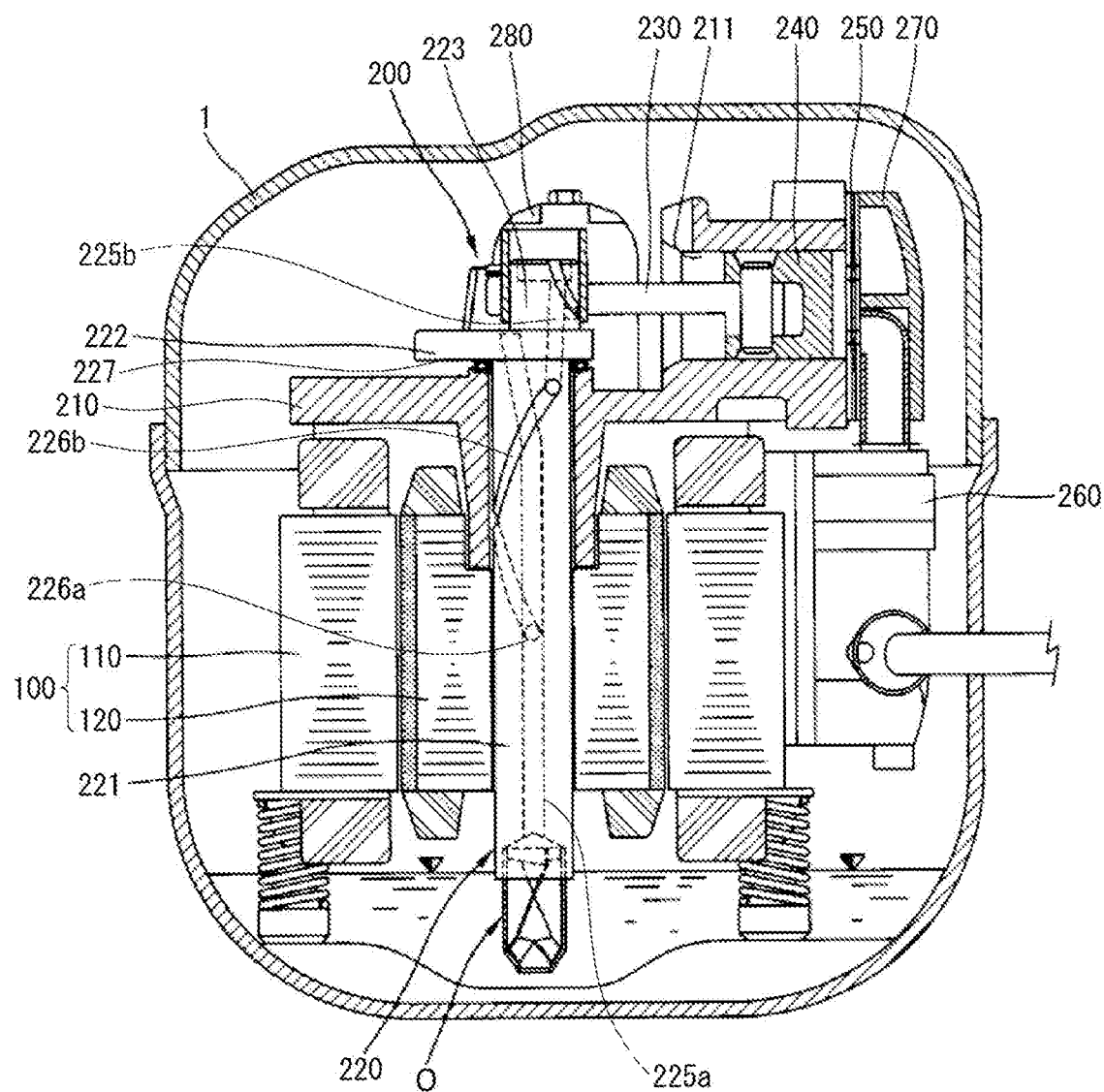
FIG. 2 is a schematic diagram of a reciprocating compressor according to an embodiment.
Figure 3:
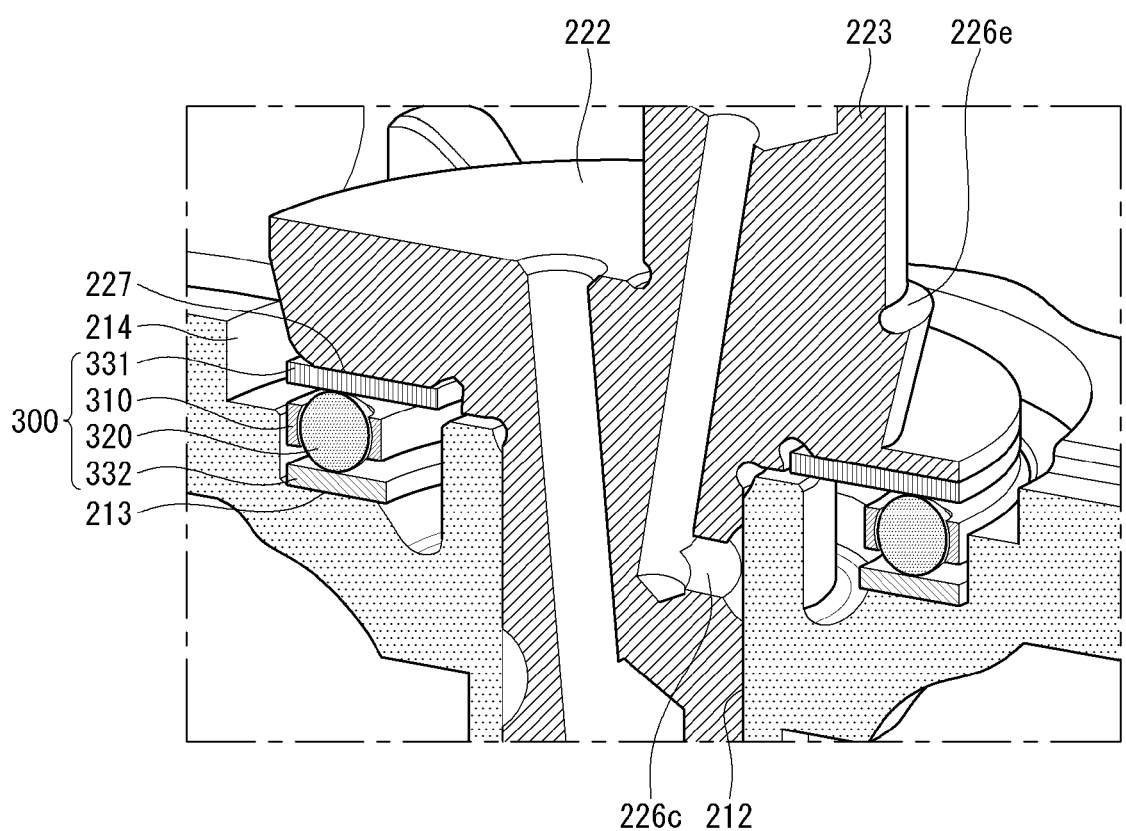
FIG. 3 is a diagram for explaining a structure of a main part of a reciprocating compressor according to an embodiment.

FIG. 2 is a schematic diagram of a reciprocating compressor according to an embodiment. FIG. 3 is a diagram for explaining a structure of a main part of a reciprocating compressor according to an embodiment.

A reciprocating compressor according to an embodiment may include a motor 100 installed inside of an airtight container 1 to perform a rotational motion and a compression unit 200 that is installed on or at an upper side of the motor 100 and compresses refrigerant by receiving a rotational force of the motor 100. The motor 100 may be a constant speed motor that rotates only forward, a constant speed motor capable of forward and reverse rotation, or an inverter motor, for example. The motor 100 may include a stator 110 installed in the cylinder block 210 inside of the airtight container 1 and a rotor 120 rotatably installed inside of the stator 110.

The compression unit 200 may include a cylinder block 210 provided with a cylinder 211 to form a compression space and elastically supported by the airtight container 1, a crankshaft 220 inserted into the cylinder block 210 to be supported in radial and axial directions and coupled to the rotor 120 of the motor 100 to transmit the rotational force, a connecting rod 230 rotatably coupled to the crankshaft 220 to convert a rotational motion of the crankshaft 220 into a linear motion, a piston 240 rotatably coupled to the connecting rod 230 to compress the refrigerant while reciprocating in a straight line in the cylinder 211, a valve assembly 250 coupled to a front end of the cylinder block 210 and having a suction valve and a discharge valve, a suction muffler 260 coupled to a suction side of the valve assembly 250, a discharge cover 270 coupled to a discharge side of the valve assembly 250, and a discharge muffler 280 that communicates with the discharge cover 270 to attenuate discharge noise of the refrigerant discharged. In the reciprocating compressor as described above, when power is applied to the stator 110 of the motor 100, the rotor 120 rotates together with the crankshaft 220 by an interaction force between the stator 110 and the rotor 120, the connecting rod 230 coupled to a pin 223 of the crankshaft 220 performs a pivoting motion, the piston 240 coupled to the connecting rod 230 compresses the refrigerant and discharges it to the discharge cover 270 while reciprocating linearly in the cylinder 211, the refrigerant discharged through the discharge cover 270 passes through the discharge muffler 280, and this series of processes is repeated for a refrigeration cycle.

At the same time, while the crankshaft 220 rotates, an oil feeder O installed at a lower end of the crankshaft 220 pumps oil stored in a reservoir of the airtight container 1. This oil is suctioned through an oil passage of the crankshaft 220 and supplied to each sliding surface, while some is scattered from an upper end of the crankshaft 220 to cool the motor 100.

Hereinafter, a configuration of the crankshaft for suctioning up oil stored in the oil reservoir of the airtight container 1 is as follows.

That is, as shown in FIGS. 2 and 3, the crankshaft 220 may include a shaft 221 coupled to the rotor 120 and inserted into shaft hole 212 of the cylinder block 210 to be supported by the cylinder block 210 in the radial direction, an eccentric mass 222 formed eccentrically in a scalloped flange shape or eccentric circular flange shape at an upper end of the shaft 221 to form a plate-shaped extension, and pin 223 formed eccentrically with respect to the shaft 221 on an upper surface of the eccentric mass 222 and into which the connecting rod 230 is rotatably inserted.

In the shaft 221, a first journal bearing surface and a second journal bearing surface may be formed on an outer circumferential surface corresponding to the journal bearing surface of the shaft hole 212 at a predetermined interval. Also, from the lower end to the upper end of the shaft 221, a first oil passage 225a may be formed in an axial direction or slightly inclined in the axial direction, and a second oil passage 225b having a predetermined depth from an upper end of the pin 223 to an upper portion of the shaft 221 is formed in the axial direction. The first oil passage 225a and the second oil passage 225b may be formed not to communicate with each other.

A first oil outlet hole 226a that guides oil to the second journal bearing surface of the crankshaft 220 may be formed in or at a middle of the first oil passage 225a, that is, a portion corresponding to a lower half of the journal bearing surface of the shaft hole 212, and a first oil groove 226b having a predetermined inclination angle may be spirally formed from the first oil outlet hole 226a to a predetermined height, that is, to an almost end of the shaft hole 212.

In addition, an oil inlet hole 226c that communicates with the second oil passage 225b may be formed at an end of the first oil groove 226b, and a second oil outlet hole that guides oil suctioned through the second oil passage 225b to an outer circumferential surface may be formed in or at a middle of the second oil passage 225b, that is, at a portion coupled to the connecting rod 230.

A second oil groove 226e having a predetermined inclination angle may be spirally formed from the second oil outlet hole to an upper end of the pin 223.

With the configuration as described above, the oil pumped by the oil feeder O is suctioned through the first oil passage 225a, and a portion of the oil may be guided to the first oil groove 226b through the first oil outlet hole 226a. The oil guided into the first oil groove 226b rides up the first oil groove 226b to sequentially lubricate the second journal bearing surface and the first journal bearing surface of the crankshaft 220.

Next, the oil lubricating the first and second journal bearing surfaces flows into the second oil passage 225b through the oil inlet hole 226c and is suctioned up again, and a portion of this oil flows out from the second oil groove 226e through the second oil outlet hole to lubricate the pin 223 of the crankshaft 220. The crankshaft is supported in the radial direction as well as in the axial direction while inserted into the shaft hole provided in the cylinder block and rotating. However, as the rotor is coupled to the crankshaft as described above, an axial load increases due to a weight of the crankshaft and the rotor, and friction loss with the cylinder block may be increased by the axial load.

Considering this, it may be considered a method of reducing axial friction loss by installing a point-contact bearing, such as a ball bearing, between the thrust surface of the cylinder block and the thrust surface of the crankshaft. Thus, a thrust surface 213 may be formed around an upper end of the shaft hole 212 formed in or at a center of the cylinder block 210 so that the ball bearing 300 that supports the crankshaft 220 in the axial direction is placed on it. At an edge of the thrust surface 213, a bearing restraining part or portion 214 may be formed at a predetermined height so that a lower washer (or second washer) 332 described hereinafter may be supported in the radial direction. In this case, the thrust surface 227 of the crankshaft 220 opposite the thrust surface 213 of the cylinder block 210 may be formed flat. The bearing restraining part 214 may be formed in a stepwise manner.

Ball bearing 300 may include a ball cage 310 in a ring shape, at least three or more balls 320 rotatably coupled to the ball cage 310, and washers 331 and 332 installed to be contact with both sides of the balls 320 in the axial direction. The washer may be installed on only one side of both sides in the axial direction of the balls 320, but as reliability of the compressor may be improved when the washers are installed on both sides of the balls 320 in the axial direction, a case in which washers are installed on both sides of the balls 320 in the axial direction will be described as an example.

A diameter of the balls 320 may be larger than a thickness of the ball cage 310.

The washers 331 and 332 may be divided into an upper washer (or first washer) 331 and a lower washer (or second washer) 332 around the balls 320. The upper washer 331 and the lower washer 332 may be installed to be supported on the cylinder block 210 and the crankshaft 220 in the radial direction, respectively. That is, while the upper washer 331 is inserted into an outer circumferential surface of the crankshaft 220 together with the ball cage 310 and supported in the radial direction, the lower washer 332 may be installed inside of the bearing restraining part 214 provided on the thrust surface 213 of the cylinder block 210. The bearing restraining part 214 may be formed around the shaft hole 212 in the thrust surface 213 of the cylinder block 210, and may be coupled so that an outer circumferential surface of the lower washer 332 is in contact with a part or portion of the inner circumferential surface thereof.

As described above, as the ball bearing 300 is installed between the cylinder block 210 and the crankshaft 220, axial friction loss between the cylinder block 210 and the crankshaft 220 may be significantly reduced, so that energy efficiency of the compressor may be improved. In addition, as the ball bearing 300, in particular, the lower washer 332, is radially constrained by the bearing restraining part 214 of the cylinder block 210, the lower washer 332 may always maintain its original position, so that the ball bearing 300 may operate stably.

The upper washer 331 and the lower washer 332 may be made of, for example, heat-treated bearing steel with surface hardness in the range of HRC58 to 68, for example, HRC58 to 62.

Also, the ball 320 may be formed to have a surface hardness slightly higher than the surface hardness of the upper washer 331 and the lower washer 332. More specifically, the ball 320 may be made of, for example, carburized and quenched bearing steel in a manner in which the surface hardness is within a range of HRC60 to 70, for example, within a range of HRC62 to 67.

Therefore, it is possible to restrain or prevent a surface of the ball 320 from peeling in advance, and it is possible to restrain or prevent that a peeled portion wears with the ball 320, the upper washer 331, or the lower washer 332, and damage occurs to the ball 320, the upper washer 331, or the lower washer 332. Therefore, it is possible to restrain or prevent a decrease in life of the ball bearing 300 and improve reliability of the ball bearing 300.

With this configuration, a reciprocating compressor according to an embodiment includes a rotation preventing portion that prevents the washer from rotating even intermittently with respect to the corresponding thrust surface.

Figure 4:
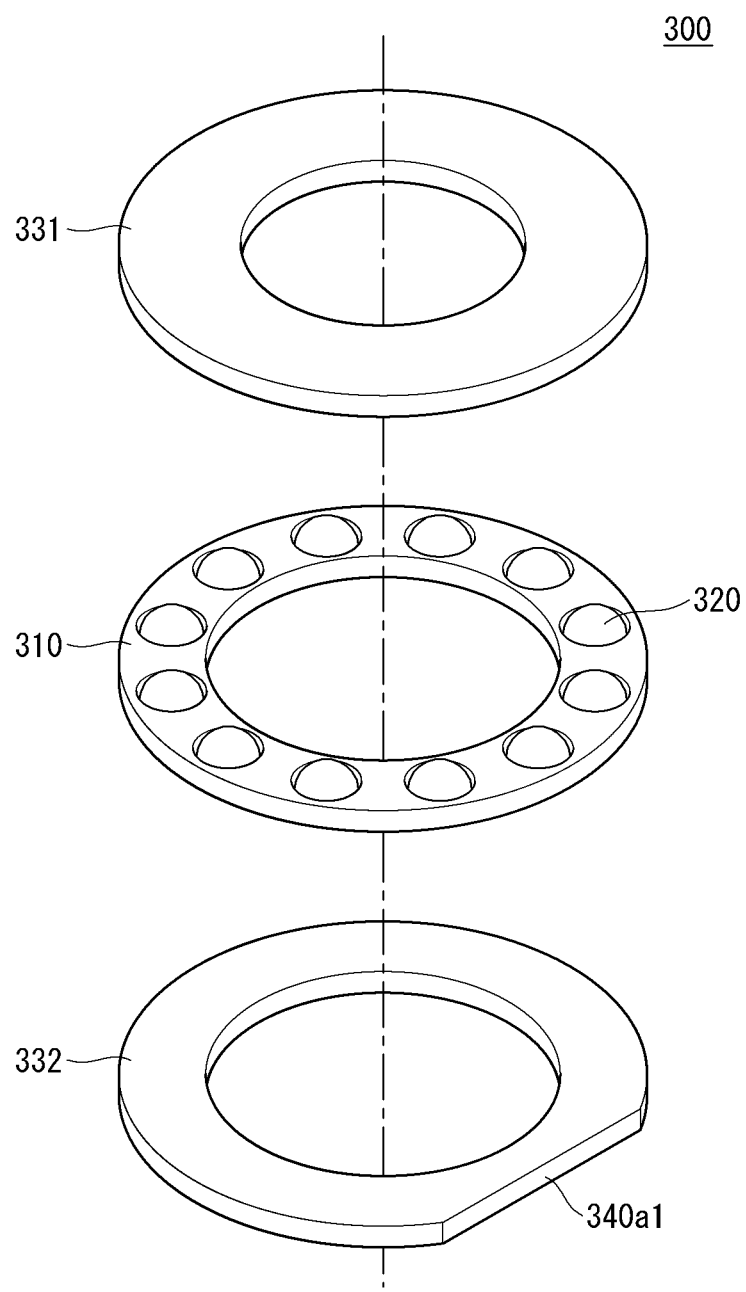
FIG. 4 is a view for explaining a ball bearing structure according to an embodiment.
Figure 5:
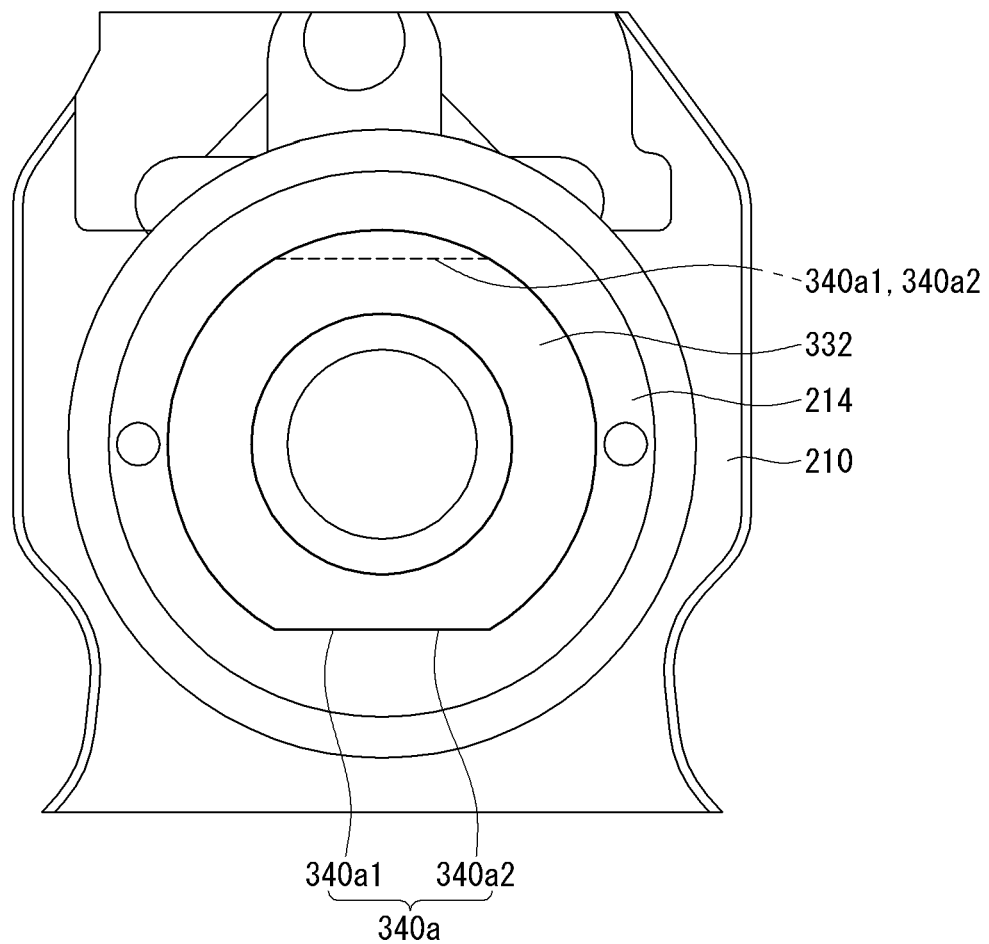
FIG. 5 is a plan view illustrating a state in which a lower washer of FIG. 4 is coupled to a bearing restraining part of a cylinder block.

FIG. 4 is a view for explaining a ball bearing structure according to an embodiment. FIG. 5 is a plan view illustrating a state in which a lower washer of FIG. 4 is coupled to a bearing restraining part of a cylinder block.

Referring to the drawings, the ball bearing 300 according to this embodiment may include a lower washer rotation preventing part or portion 340*a* that restrains or prevent the lower washer 332 from rotating with respect to the thrust surface 213 of the cylinder block 210. The lower washer rotation preventing part 340*a* may include at least one straight line part or portion 340*a*1 formed on an outer circumferential surface of the lower washer 332, and at least one straight line part or portion 340*a*2 formed on an inner circumferential surface of the bearing restraining part 214 and facing the at least one straight line part 340*a*1 of the lower washer 332. In addition, a remaining portion of the outer circumferential surface of the lower washer 332, except for the at least one straight line part 340*a*1, may be formed in a circular shape, and a remaining portion of the inner circumferential surface of the bearing restraining part 214, except for the at least one straight line part, may be formed in a circular shape.

According to this configuration, as a distance from a center of the lower washer 332 to the at least one straight line part 340*a*1 is shorter than a distance from the center of the lower washer 332 to the remaining circular portions, as the lower washer 332 is coupled to the bearing restraining part 214 so that the at least one straight line part 340*a*1 formed on the outer circumferential surface of the lower washer 332 faces the at least one straight line part 340*a*2 formed on the inner circumferential surface of the bearing restraining part 214, it is possible to restrain or prevent the lower washer 332 from rotating with respect to the thrust surface 213 of the cylinder block 210 inside of the bearing restraining part 214. With this configuration, a tiny gap may exist between the outer circumferential surface of the lower washer 332 and the inner circumferential surface of the bearing restraining part 214. Alternatively, the outer circumferential surface of the lower washer 332 and the inner circumferential surface of the bearing restraining part 214 may be in contact with each other.

As shown by the dotted line in the drawing, a plurality of the at least one straight line parts 340*a*1 and 340*a*2 may be provided, for example, two or more, respectively. In this case, each of the straight line parts may be disposed at equal intervals on the outer circumferential surface of the lower washer 332 and the inner circumferential surface of the bearing restraining part 214.

For example, when two straight line parts 340*a*1 and 340*a*2 are provided, the straight line parts may be formed such that a distance between centers in a longitudinal direction is maintained at 180 degrees. When three straight line parts 340*a*1 and 340*a*2 are provided, respectively, the straight line parts may be formed such that a distance between centers in the longitudinal direction is maintained at 120 degrees.

Figure 6:
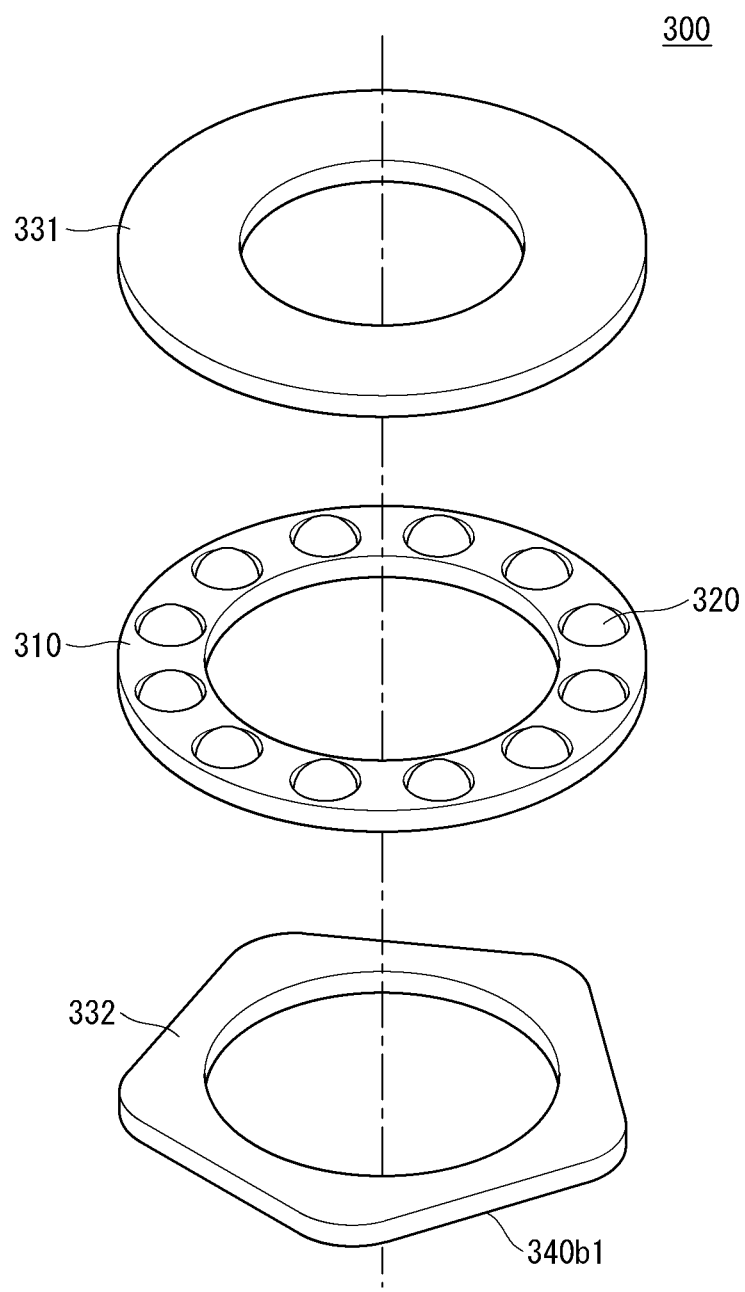
FIG. 6 is a view for explaining a ball bearing structure according to a another embodiment.
Figure 7:
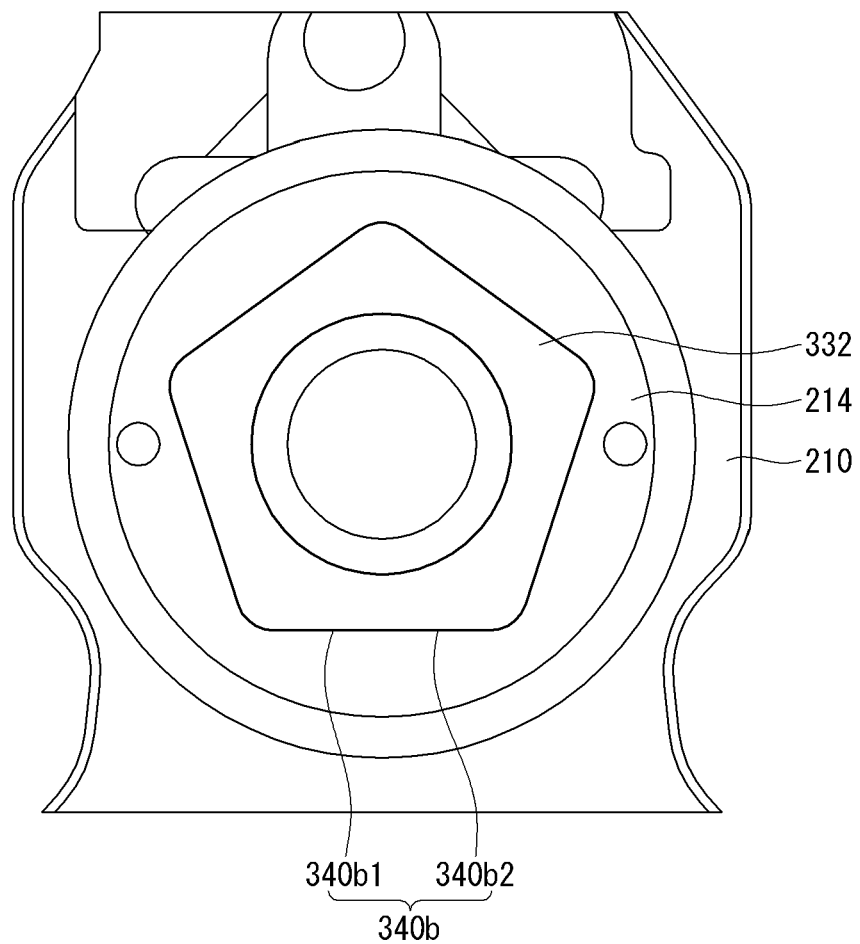
FIG. 7 is a plan view illustrating a state in which a lower washer of FIG. 6 is coupled to a bearing restraining part of a cylinder block.

FIG. 6 is a view for explaining a ball bearing structure according to another embodiment. FIG. 7 is a plan view illustrating a state in which a lower washer of FIG. 6 is coupled to a bearing restraining part of a cylinder block.

Lower washer rotation preventing part or portion 340*b* of this embodiment may include a polygonal part or portion 340*b*1 formed on the outer circumferential surface of the lower washer 332, and a polygonal part or portion 340*b*2 formed on the inner circumferential surface of the bearing restraining part 214 and coupled with the polygonal part 340*b*1 of the lower washer 332. In FIGS. 6 and 7, the polygonal parts 340*b*1 and 340*b*2 are each formed in a pentagonal shape, as an example, but the shape of the polygonal parts 340*b*1 and 340*b*2 is not particularly limited as long as the shape can prevent the lower washer 332 from rotating with respect to the thrust surface 213 of the cylinder block 210.

For example, the polygonal parts 340*b*1 and 340*b*2 may be variously formed in a quadrangle, a hexagon, a heptagon, or an octagon. Also, the shapes of the polygonal part 340*b*1 of the lower washer 332 and the polygonal part 340*b*2 of the bearing restraining part 214 are not necessarily identical.

With this configuration, a tiny gap may exist between the outer circumferential surface of the lower washer 332 and the inner circumferential surface of the bearing restraining part 214. Alternatively, the outer circumferential surface of the lower washer 332 and the inner circumferential surface of the bearing restraining part 214 may be in contact with each other. According to this configuration, as the polygonal part 340*b*1 formed on the outer circumferential surface of the lower washer 332 is coupled to the polygonal part 340*b*2 formed on the inner circumferential surface of the bearing restraining part 214, it is possible to restrain or prevent the lower washer 332 from rotating with respect to the thrust surface 213 of the cylinder block 210 inside of the bearing restraining part 214.

Figure 8:
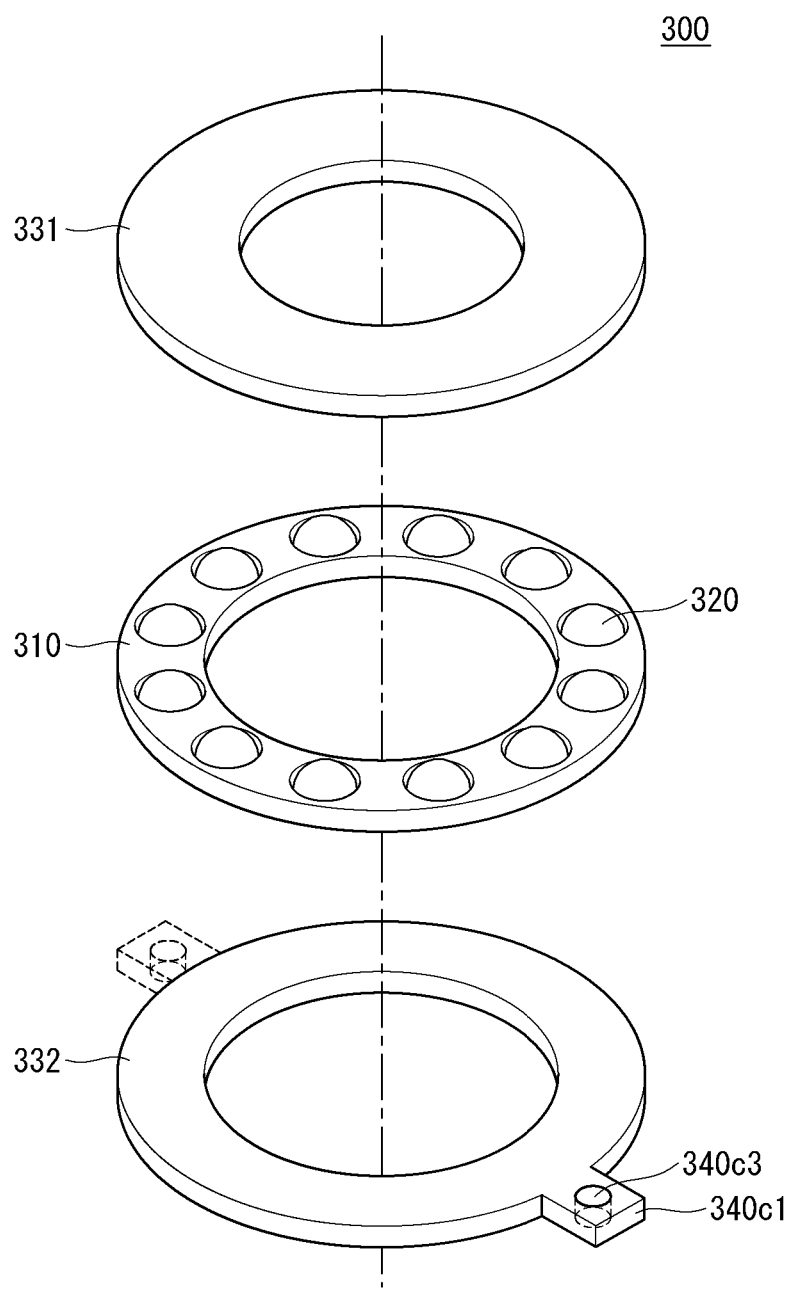
FIG. 8 is a view for explaining a ball bearing structure according to yet another embodiment.
Figure 9:
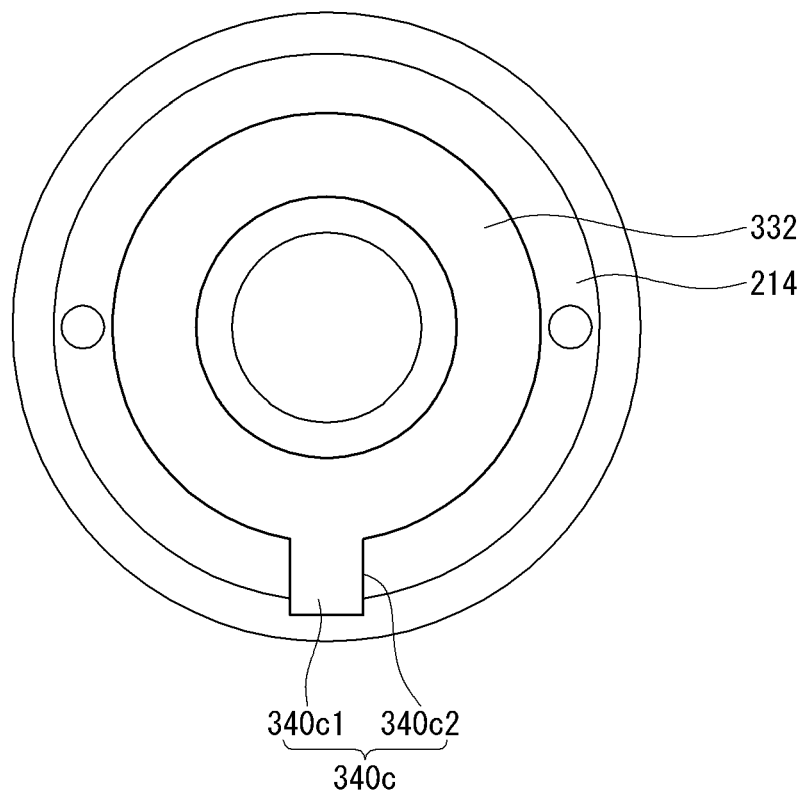
FIG. 9 is a plan view illustrating a state in which a lower washer of FIG. 8 is coupled to a bearing restraining part of a cylinder block.
Figure 10:
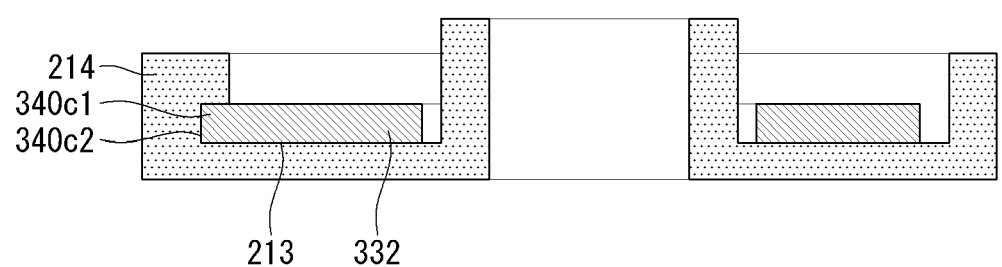
FIG. 10 is a cross-sectional view showing a state in which the lower washer of FIG. 8 is coupled to the bearing restraining part of the cylinder block.

FIG. 8 is a view for explaining a ball bearing structure according to yet another embodiment. FIG. 9 is a plan view illustrating a state in which a lower washer of FIG. 8 is coupled to a bearing restraining part of a cylinder block, and FIG. 10 is a cross-sectional view showing a state in which the lower washer of FIG. 8 is coupled to the bearing restraining part of the cylinder block.

Lower washer rotation preventing part 340*c* of this embodiment may include at least one protrusion 340*c*1 that protrudes from the outer circumferential surface of the lower washer 332 toward the bearing restraining part 214, and at least one protrusion insertion groove 340*c*2 formed in the bearing restraining part 214 and coupled to each of the at least one protrusions 340*c*1. With this configuration, a tiny gap may exist between the outer circumferential surface of the lower washer 332 and the inner circumferential surface of the bearing restraining part 214. Alternatively, the outer circumferential surface of the lower washer 332 and the inner circumferential surface of the bearing restraining part 214 may be in contact with each other.

In addition, as shown by the dotted line in the drawing, a plurality of the at least one protrusion 340*c*1 and the at least one protrusion insertion groove 340*c*2 may be provided, for example, two or more, respectively. In this case, each of the protrusion 340*c*1 and each of the protrusion insertion groove 340*c*2 may be disposed at equal intervals on the outer circumferential surface of the lower washer 332 and the inner circumferential surface of the bearing restraining part 214.

For example, when two protrusions 340c1 and two protrusion insertion grooves 340c2 are provided, the protrusions 340c1 and the protrusion insertion groove 340c2 may be formed to maintain an angle of 180 degrees between the outer circumferential surface of the lower washer 332 and the inner circumferential surface of the bearing restraining part 214, respectively, and when three protrusions 340c1 and three protrusion insertion grooves 340c2 are provided, respectively, the protrusion 340c1 and the protrusion insertion groove 340c2 may be formed to maintain an angle of 120 degrees between the outer circumferential surface of the lower washer 332 and the inner circumferential surface of the bearing restraining part 214, respectively.

With to this configuration, as the protrusion 340c1 formed on the outer circumferential surface of the lower washer 332 is coupled to the protrusion insertion groove 340c2 formed in the bearing restraining part 214, it is possible to restrain or prevent the lower washer 332 from rotating with respect to the thrust surface 213 of the cylinder block 210 inside of the bearing restraining part 214.

As shown by the dotted line, the protrusion 340c1 may be fixed to the protrusion insertion groove 340c2 by, for example, a pin 340c3 or a screw.

With this configuration, it is possible to restrain or prevent the lower washer 332 from rotating with respect to the thrust surface 213 of the cylinder block 210 inside of the bearing restraining part 214.

In the above, a case in which the lower washer rotation preventing part is provided has been described, and according to embodiments, it may optionally be provided with the lower washer rotation preventing part.

Figure 11:
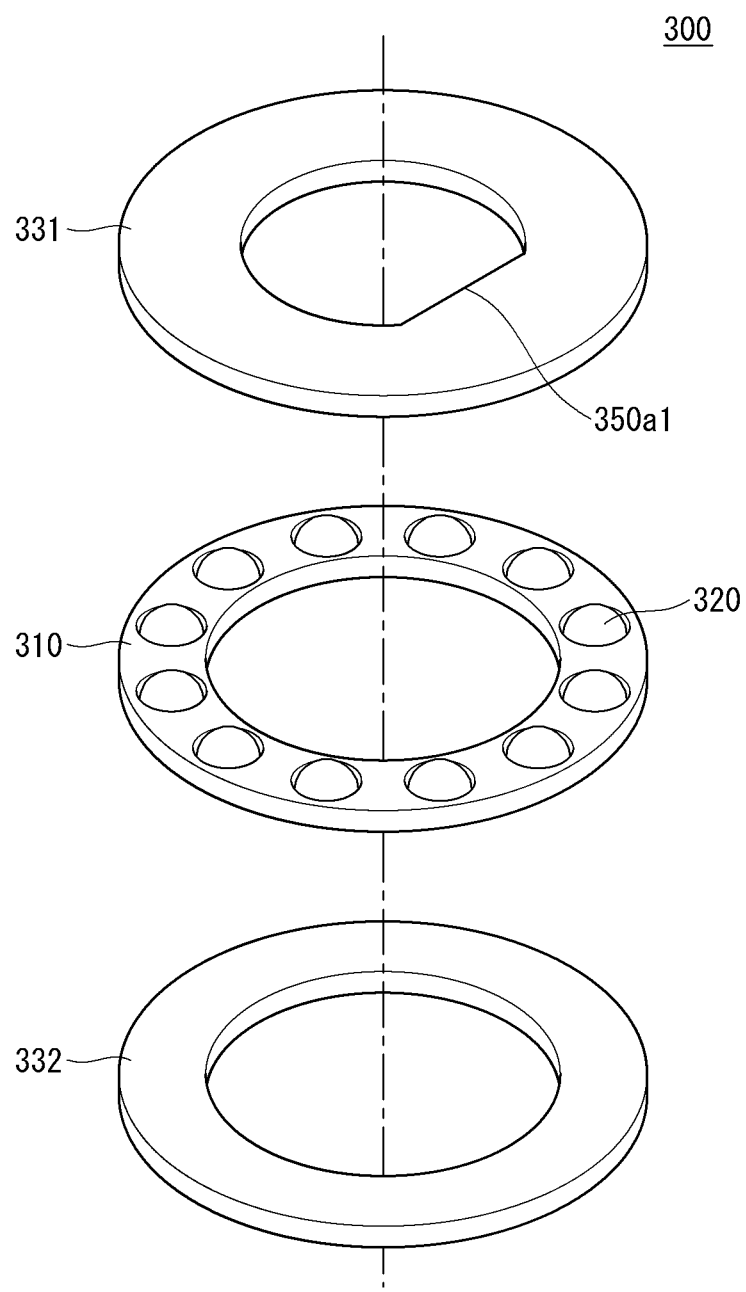
FIG. 11 is a view for explaining a ball bearing structure according to still another embodiment.
Figure 12:
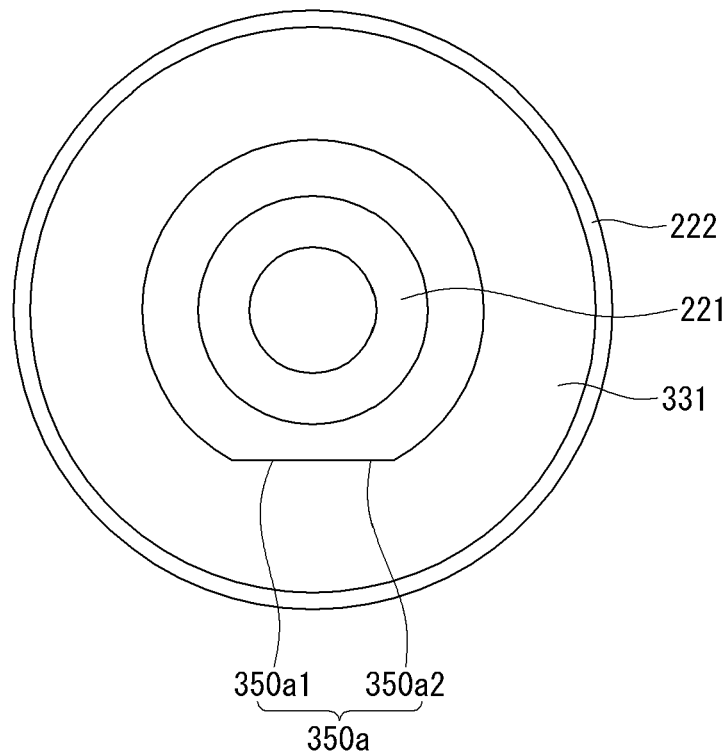
FIG. 12 is a plan view illustrating a state in which an upper washer of FIG. 11 is coupled to a shaft of a crankshaft.
Figure 13:
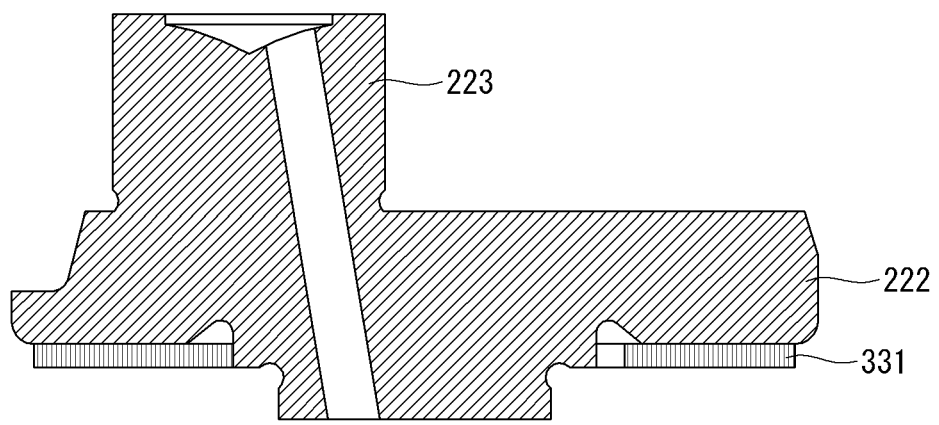
FIG. 13 is a cross-sectional view showing a state in which an upper washer of FIG. 11 is coupled to a shaft of a crankshaft.

FIG. 11 is a view for explaining a ball bearing structure according to still another embodiment. FIG. 12 is a plan view illustrating a state in which an upper washer of FIG. 11 is coupled to a shaft of a crankshaft. FIG. 13 is a cross-sectional view showing a state in which the upper washer of FIG. 11 is coupled to the shaft of the crankshaft.

The reciprocating compressor according to embodiments may include upper washer rotation preventing part or portion 350a that restrains or prevents upper washer 331 from rotating on the thrust surface of crankshaft 220. The upper washer rotation preventing part 350a of this embodiment may include at least one straight line part or portion 350a1 formed on the inner circumferential surface of the upper washer 331, and at least one straight line part or portion 350a2 formed on an outer circumferential surface of the shaft 221 of the crankshaft 220 and facing the at least one straight line part 350a1 of the upper washer 331. In addition, a remaining portion of the inner circumferential surface of the upper washer 331, except for the at least one straight line part 350a1, may be formed in a circular shape, and a remaining portion of the outer circumferential surface of the shaft 221 of the crankshaft 220, except for the at least one straight line part 350a2, may be formed in a circular shape.

According to this configuration, as a distance from the center of the upper washer 331 to the at least one straight line part 350a1 is shorter than a distance from the center of the upper washer 331 to the remaining circular portions, as the upper washer 332 is coupled to the shaft 221 so that the at least one straight line part 350a1 formed on the inner circumferential surface of the upper washer 331 faces the at least one straight line part 350a2 formed on the outer circumferential surface of the shaft part 221, it is possible to restrain or prevent the upper washer 331 from rotating with respect to the thrust surface 227 outside of the shaft part 221. With this configuration, a tiny gap may exist between the inner circumferential surface of the upper washer 331 and the outer circumferential surface of the shaft part 221. Alternatively, the inner circumferential surface of the upper washer 331 and the outer circumferential surface of the shaft part 221 may be in contact with each other.

In addition, a plurality of the at least one straight line parts 350a1 and 350a2 may be provided, for example, two or more, respectively. In this case, each of the straight line parts may be disposed at equal intervals on the inner circumferential surface of the upper washer 331 and the outer circumferential surface of the shaft 221, respectively.

For example, when two straight line parts 350a1 and 350a2 are provided, respectively, the straight line parts may be formed such that a distance between centers in the longitudinal direction is maintained at 180 degrees. When three straight line parts 350a1 and 350a2 are provided, respectively, the straight line parts may be formed such that a distance between centers in the longitudinal direction is maintained at 120 degrees.

According to this configuration, as the upper washer 331 is coupled to the shaft 221 of the crankshaft 220 so that the at least one straight line part 350a1 formed on the inner circumferential surface of the upper washer 331 faces the at least one straight line part 350a2 formed on the outer circumferential surface of the shaft 221 of the crankshaft 220, it is possible to restrain or prevent the upper washer 331 from rotating with respect to the crankshaft 220 on the thrust surface 227 of the crankshaft 220.

The upper washer rotation preventing part according to embodiments may be provided together with any one lower washer rotation preventing part selected from among the lower washer rotation preventing parts of the previous embodiments described above.

Figure 14:
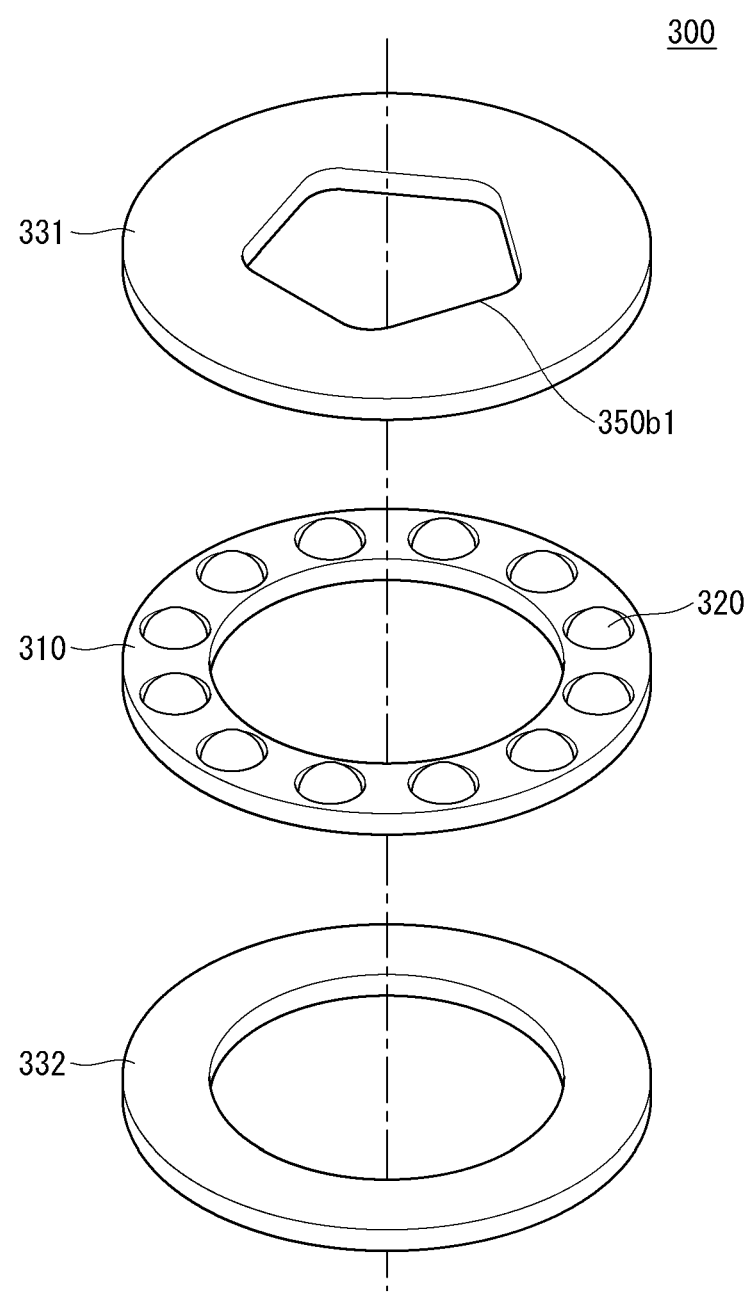
FIG. 14 is a view for explaining a ball bearing structure according to a further embodiment.
Figure 15:
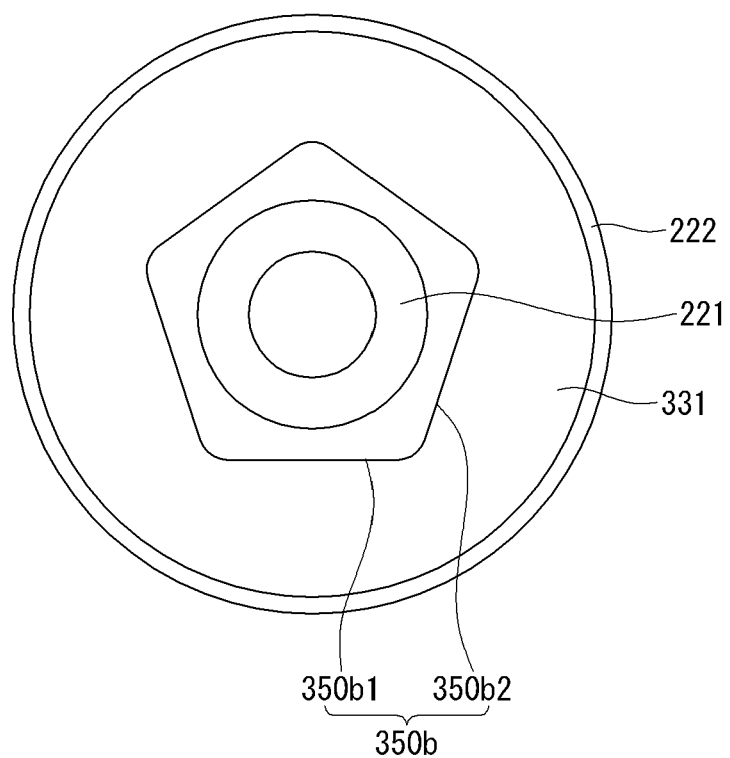
FIG. 15 is a plan view illustrating a state in which an upper washer of FIG. 14 is coupled to a shaft of a crankshaft.

FIG. 14 is a view for explaining a ball bearing structure according to a further embodiment. FIG. 15 is a plan view illustrating a state in which an upper washer of FIG. 14 is coupled to a shaft of a crankshaft.

Upper washer rotation preventing part or portion 350b of this embodiment may include a polygonal part or portion 350b1 formed on the inner circumferential surface of the upper washer 331 and a polygonal part or portion 350b2 formed on the outer circumferential surface of the shaft 221 of the crankshaft 220 and facing the polygonal part 350b1 of the upper washer 331. In FIGS. 14 and 15, the polygonal parts 350b1 and 350b2 are each formed in a pentagonal shape as an example, but the shape of the polygonal parts 350b1 and 350b2 is not particularly limited as long as the shape can prevent the upper washer 331 from rotating with respect to the thrust surface 227 of the crankshaft 220.

For example, the polygonal parts 350b1 and 350b2 may be formed in various forms, such as a quadrangle, a hexagon, a heptagon, or an octagon. Also, the shapes of the polygonal part 350b1 of the upper washer 331 and the polygonal part 350b2 of the shaft 221 are not necessarily identical.

In this configuration, a tiny gap may exist between the inner circumferential surface of the upper washer 331 and the outer circumferential surface of the shaft 221. Alternatively, the inner circumferential surface of the upper washer 331 and the outer circumferential surface of the shaft 221 may be contact with each other.

According to this configuration, as the polygonal part 350b1 formed on the inner circumferential surface of the upper washer 331 is coupled to the polygonal part 350b2 formed on the outer circumferential surface of the shaft 221 of the crankshaft 220, it is possible to restrain or prevent the upper washer 331 from rotating with respect to the thrust surface 227 outside of the shaft part 221.

The upper washer rotation preventing part according to embodiments may be provided with any one of the lower washer rotation preventing part selected from among the lower washer rotation preventing parts of the previous embodiments described above.

Figure 16:
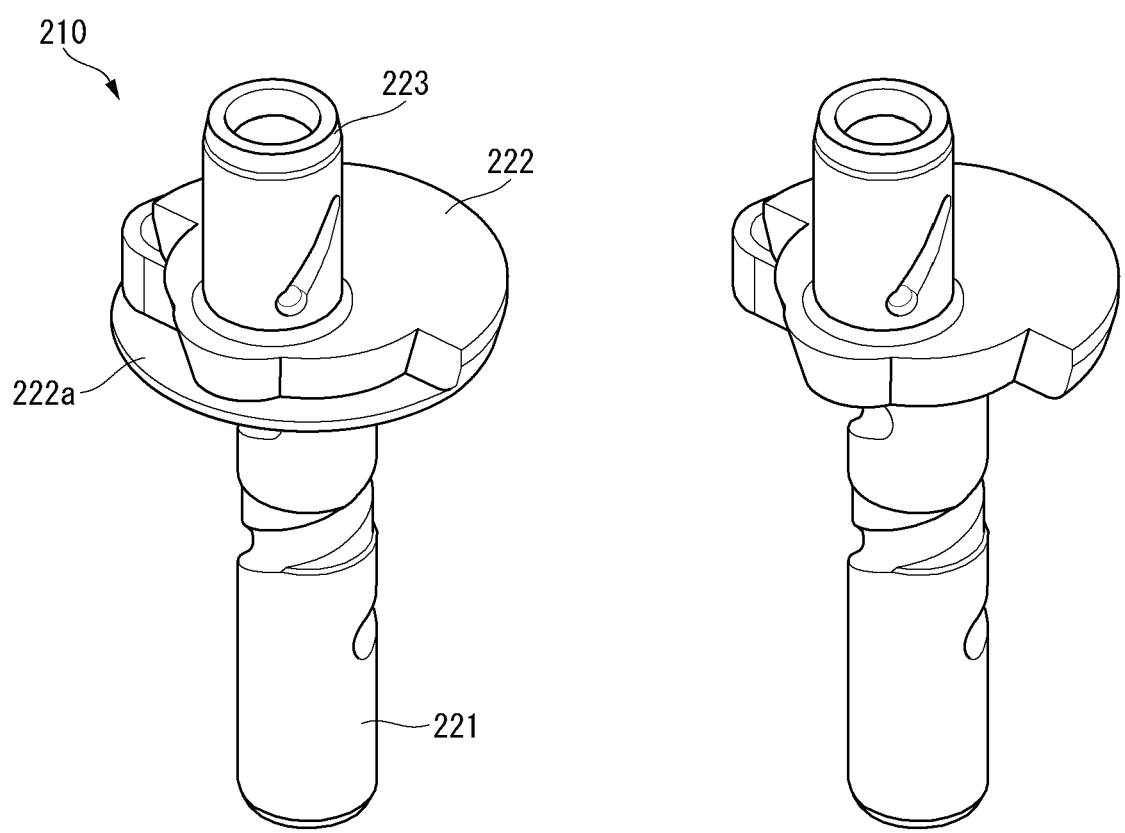
FIG. 16 is a perspective view of a crankshaft provided in a reciprocating compressor according to an embodiment and a crankshaft provided in a reciprocating compressor according to the related art.
Figure 17:
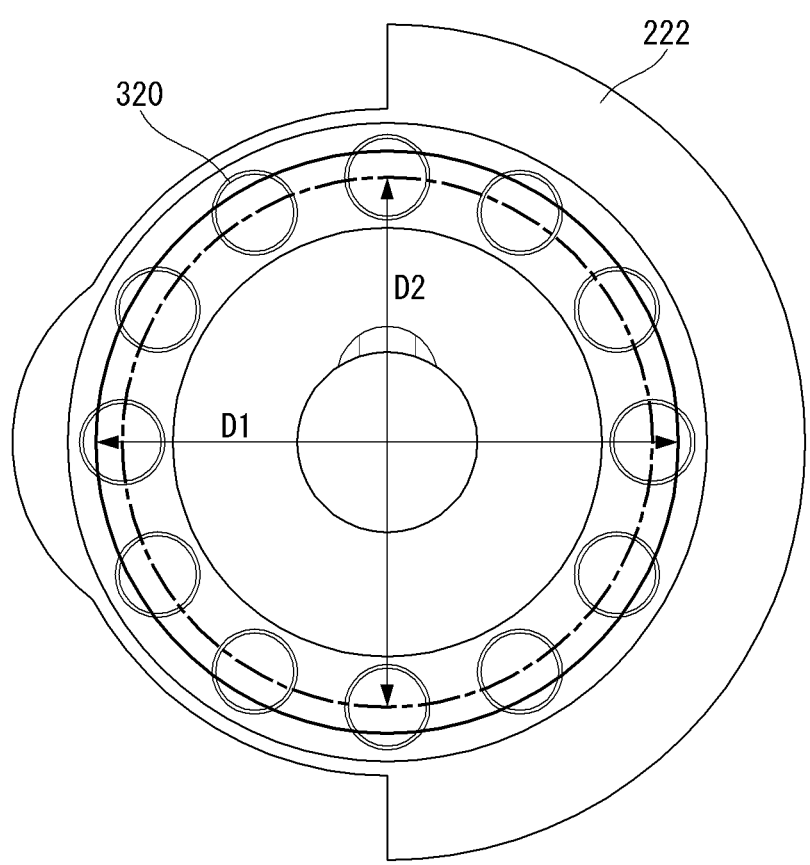
FIG. 17 is a diagram comparing a size of a circle connecting a shortest outer diameter of a thrust surface of a crankshaft provided in a reciprocating compressor according to an embodiment and center points of balls.

FIG. 16 is a perspective view of a crankshaft provided in a reciprocating compressor according to embodiments and a crankshaft provided in a reciprocating compressor according to the related art. What is shown on the left is the crankshaft provided in the reciprocating compressor according to embodiments, and what is shown on the right is the crankshaft provided in the reciprocating compressor according to the related art. FIG. 17 is a diagram comparing a size of a circle connecting a shortest outer diameter of a thrust surface of a crankshaft provided in a reciprocating compressor according to embodiments and center points of balls.

Referring to the drawings, the crankshaft provided in the reciprocating compressor according to embodiments has an extended thrust surface compared to a conventional crankshaft so that a shortest outer diameter (D1) of the thrust surface is formed larger than a diameter (D2) of the circle connecting centers of the balls. In FIG. 16, a portion denoted by reference numeral 222a is an extended thrust surface compared to a conventional crankshaft.

According to this configuration, as the size of the thrust surface of the crankshaft provided in the reciprocating compressor according to embodiments is increased compared to that of the crankshaft provided in the reciprocating compressor according to the related art, the ball may rotate stably on the washer and a uniform force is applied to the ball so that imbalance of force does not occur.

Embodiments disclosed herein provide a reciprocating compressor in which a ball bearing assembly is installed between a thrust surface of a cylinder block and a thrust surface of a crankshaft. Embodiments disclosed herein further provide a reciprocating compressor in which relative rotation of a washer with respect to a thrust surface of a cylinder block and/or a thrust surface of a crankshaft is impossible.

Embodiments disclosed herein provide a reciprocating compressor in which relative rotation of the washer with respect to the thrust surface of the cylinder block and/or the thrust surface of the crankshaft is impossible even if a rotational force higher than a viscous force acting on the washer is applied because the viscosity of the oil is lowered. Embodiments disclosed herein also provide a reciprocating compressor having a ball bearing so that the ball may stably rotate on the washer and a uniform force is applied to the ball.

Technical problems to be achieved by embodiments disclosed herein are not limited to the technical problems discussed above, and other technical problem which are not mentioned above may be clearly understood from the description by those skilled in the art to which the embodiments pertain.

A reciprocating compressor according to embodiments disclosed herein may include a ball bearing positioned between a thrust surface of a cylinder block and a thrust surface of a crankshaft. The ball bearing may include a ball cage in a ring shape, a plurality of balls rotatably coupled to the ball cage, a washer positioned at least one of between the thrust surface of the cylinder block and the balls and between the thrust surface of the crankshaft and the balls, and a rotation preventing part or portion that for limits rotation of the washer with respect to the corresponding thrust surface.

According to the reciprocating compressor having the rotation preventing part, as relative rotation of the washer with respect to the thrust surface of the cylinder block and/or the thrust surface of the crankshaft is restrained even if a rotational force higher than a viscous force acting on the washer is applied because the viscosity of the oil is lowered, it is possible to eliminate the problem of deterioration of reliability and performance of the compressor.

The washer may include at least one of a lower washer positioned between the thrust surface of the cylinder block and the balls, and an upper washer positioned between the thrust surface of the crankshaft and the balls.

A compression unit installed on an upper side of the motor to compress refrigerant by a rotational force of the motor may further include a bearing restraining part or portion which is formed around the shaft hole into which the shaft of the crankshaft is inserted in the thrust surface of the cylinder block and coupled to the lower washer. When the lower washer is coupled to the bearing restraining part, radial movement of the lower washer may be restricted.

The ball bearing may include a lower washer rotation preventing part or portion that limits rotation of the lower washer on the thrust surface of the cylinder block. For example, the lower washer rotation preventing part may include at least one straight line part or portion formed on an outer circumferential surface of the lower washer and at least one straight line part or portion formed on an inner circumferential surface of the bearing restraining part and facing the at least one straight line part of the lower washer, and a remaining portion of the outer circumferential surface of the lower washer, except for the at least one straight line part, may be formed in a circular shape, and a remaining portion of the inner circumferential surface of the bearing restraining part, except for the at least one straight line part, may be formed in a circular shape. According to this configuration, by coupling the lower washer to the bearing restraining part so that the at least one straight line part formed on the outer circumferential surface of the lower washer faces the at least one straight line part formed on the inner circumferential surface of the bearing restraining part, it is possible to restrain or prevent the lower washer from rotating with respect to the thrust surface of the cylinder block inside or the bearing restraining part.

As another example, the lower washer rotation preventing part may include a polygonal part or portion formed on the outer circumferential surface of the lower washer and a polygonal part or portion formed on the inner circumferential surface of the bearing restraining part and coupled to the polygonal part of the lower washer. According to this configuration, by coupling the polygonal part formed on the outer circumferential surface of the lower washer to the polygonal part formed on the inner circumferential surface of the bearing restraining part, it is possible to restrain or prevent the lower washer from rotating with respect to the thrust surface of the cylinder block inside of the bearing restraining part.

As another example, the lower washer rotation preventing part may include at least one protrusion that protrudes from the outer circumferential surface of the lower washer toward the bearing restraining part, and at least one protrusion insertion groove formed in the bearing restraining part and coupled to each of the protrusions. According to this configuration, by coupling the protrusion formed on the outer circumferential surface of the lower washer to the protrusion insertion groove formed in the bearing restraining part, it is possible to restrain or prevent the lower washer from rotating with respect to the thrust surface of the cylinder block inside the bearing restraining part.

The protrusion may be fixed to the protrusion insertion groove by, for example, a pin or a screw. According to this configuration, it is possible to more reliably restrain or prevent the lower washer from rotating with respect to the thrust surface of the cylinder block inside of the bearing restraining part.

A plurality of the protrusions and a plurality of the protrusion insertion grooves may be provided, respectively. The plurality of the protrusions and the plurality of the protrusion insertion grooves may be arranged at equal intervals. According to this configuration, it is possible to more reliably restrain or prevent the lower washer from rotating with respect to the thrust surface of the cylinder block inside of the bearing restraining part.

The ball bearing may include an upper washer rotation preventing part or portion that limits rotation of the upper washer on the thrust surface of the crankshaft. As an example, the upper washer rotation preventing part may include at least one straight line part or portion formed on an inner circumferential surface of the upper washer and at least one straight line part or portion formed on an outer circumferential surface of the shaft part of the crankshaft and facing the at least one straight line part of the upper washer, and a remaining portion of the inner circumferential surface of the upper washer, except for the at least one straight line part, may be formed in a circular shape, and a remaining portion of the outer circumferential surface of the shaft part of the crankshaft, except for the at least one straight line part, may be formed in a circular shape. According to this configuration, by coupling the upper washer to the shaft part of the crankshaft so that at least one straight line part formed on the inner circumferential surface of the upper washer faces at least one straight line part formed on the outer circumferential surface of the shaft part of the crankshaft, it is possible to restrain or prevent the upper washer from rotating with respect to the crankshaft on the thrust surface of the crankshaft.

As another example, the upper washer rotation preventing part may include a polygonal part or portion formed on an inner circumferential surface of the upper washer and a polygonal part or portion formed on an outer circumferential surface of the shaft of the crankshaft and facing the polygonal part of the upper washer. According to this configuration, by coupling the polygonal part formed on the inner circumferential surface of the upper washer to the polygonal part formed on the outer circumferential surface of the shaft part of the crankshaft, it is possible to restrain or prevent the upper washer from rotating with respect to the crankshaft on the thrust surface of the crankshaft.

A shortest outer diameter of the thrust surface of the crankshaft may be formed larger than a diameter of a circle connecting centers of the balls. According to this configuration, the balls may stably rotate on the washer and a uniform force may be applied to the balls.

According to a reciprocating compressor of the embodiments disclosed herein, relative rotation of the washer with respect to the thrust surface of the cylinder block and/or the thrust surface of the crankshaft is impossible. Therefore, as the relative rotation of the washer with respect to the thrust surface of the cylinder block and/or the thrust surface of the crankshaft is impossible even if a rotational force higher than a viscous force acting on the washer is applied because the viscosity of the oil is lowered, reliability and performance of the compressor may be prevented from deteriorating even in a micro-compressor operating at a high speed of 85 rps or higher with any one of width, depth, and height of 110 mm or less based on the compressor body. Also, as the shortest outer diameter of the thrust surface of the crankshaft is formed larger than the diameter of a circle connecting the centers of the balls, the balls may stably rotate on the washer and a uniform force is applied to the balls.

Advantages obtainable from embodiments disclosed herein are not limited by the advantages mentioned above, and other advantages which are not mentioned above may be clearly understood from the description by those skilled in the art to which the embodiments pertain.

It is apparent to those skilled in the art that embodiments may be embodied in other specific forms without departing from the essential characteristics. Accordingly, the description should not be construed as restrictive in all respects but should be considered as illustrative. The scope should be determined by reasonable interpretation of the appended claims, and all changes within the equivalent scope are included in the scope.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A reciprocating compressor, comprising:
   an airtight container in which an airtight space is formed;
   a motor having a stator and a rotor and installed inside of the airtight container to generate a rotational force; and
   a compression unit installed at an upper side of the motor to compress refrigerant by the rotational force of the motor, wherein the compression unit includes:
      a crankshaft having a shaft coupled to the rotor and inserted into a shaft hole of a cylinder block, an eccentric mass formed eccentrically at an upper end of the shaft, and a pin that is formed eccentrically with respect to the shaft on an upper surface of the eccentric mass and rotates eccentrically about the shaft;
      a connecting rod rotatably coupled to the pin to convert rotational motion into linear motion;
      a piston that is rotatably coupled to the connecting rod and compresses the refrigerant while reciprocating in a straight line in the cylinder; and
      a ball bearing positioned between a thrust surface of the cylinder block and a thrust surface of the crankshaft, wherein the ball bearing includes:
         a ball cage in a ring shape;
         a plurality of balls rotatably coupled to the ball cage; and
         at least one washer positioned at least one of between the thrust surface of the cylinder block and the plurality of balls and between the thrust surface of the crankshaft and the plurality of balls, and a rotation preventing portion that limits rotation of the at least one washer with respect to the corresponding thrust surface, wherein the at least one washer includes a lower washer positioned between the thrust surface of the cylinder block and the plurality of balls, and wherein a bearing restraining portion to which the lower washer is coupled is provided around the shaft hole in the thrust surface of the cylinder block, wherein the rotation preventing portion includes a lower washer rotation preventing portion that limits rotation of the lower washer on the thrust surface of the cylinder block, wherein the lower washer rotation preventing portion includes at least one straight line portion formed on an outer circumferential surface of the lower washer and at least one straight line portion formed on an inner circumferential surface of the bearing restraining portion and facing the at least one straight line portion of the lower washer, and a remaining portion of the outer circumferential surface of the lower washer, except for the at least one straight line portion, is formed in a circular shape, and a remaining portion of the inner circumferential surface of the bearing restraining portion, except for the at least one straight line portion, is formed in a circular shape, and wherein the at least one straight line portion connects in a straight line ends of the remaining portion of the lower washer formed in a circular shape.

2. The reciprocating compressor of claim 1, wherein a shortest outer diameter of the thrust surface of the crankshaft is formed larger than a diameter of a circle connecting centers of the plurality of balls.

3. The reciprocating compressor of claim 1, wherein the at least one washer further includes an upper washer positioned between the thrust surface of the crankshaft and the plurality of balls, and wherein the rotation preventing portion further includes an upper washer rotation preventing portion that limits rotation of the upper washer on the thrust surface of the crankshaft.

4. The reciprocating compressor of claim 3, wherein the upper washer rotation preventing portion includes at least one straight line portion formed on an inner circumferential surface of the upper washer and at least one straight line portion formed on an outer circumferential surface of the shaft of the crankshaft and facing the at least one straight line portion of the upper washer.

5. The reciprocating compressor of claim 3, wherein the upper washer rotation preventing portion includes a polygonal portion formed on an inner circumferential surface of the upper washer and a polygonal portion formed on an outer circumferential surface of the shaft part of the crankshaft and facing the polygonal portion of the upper washer.

6. The reciprocating compressor of claim 3, wherein a shortest outer diameter of the thrust surface of the crankshaft is formed larger than a diameter of a circle connecting centers of the plurality of balls.

* * * * *